US009603004B2

(12) United States Patent
Kilgour et al.

(10) Patent No.: US 9,603,004 B2

(45) Date of Patent: Mar. 21, 2017

(54) NETWORK ELEMENTS, WIRELESS COMMUNICATION SYSTEM AND METHODS THEREFOR

(71) Applicant: ip.access Limited, Cambridge (GB)

(72) Inventors: Christopher Edward John Kilgour, Cambridge (GB); Naresh Harwani, Cambridge (GB)

(73) Assignee: ip.Access Limited, Cambridge (GB)

( * ) Notice: Subject to any disclaimer, the term of this patent is extended or adjusted under 35 U.S.C. 154(b) by 0 days.

(21) Appl. No.: 15/054,055

(22) Filed: Feb. 25, 2016

(65) Prior Publication Data

US 2016/0255492 A1 Sep. 1, 2016

(30) Foreign Application Priority Data

Feb. 27, 2015 (GB) .................................. 1503350.9

(51) Int. Cl.

*H04W 4/00* (2009.01)
*H04W 8/14* (2009.01)

(Continued)

(52) U.S. Cl.

CPC ............... *H04W 8/14* (2013.01); *H04W 8/02* (2013.01); *H04W 8/26* (2013.01); *H04W 48/10* (2013.01); *H04W 60/04* (2013.01); *H04W 84/045* (2013.01)

(58) Field of Classification Search

CPC ..... H04W 12/08; H04W 48/16; H04W 60/00; H04W 68/02; H04W 8/26; H04W 12/06;

(Continued)

(56) References Cited

U.S. PATENT DOCUMENTS

| | | | | |
|---|---|---|---|---|
| 7,512,652 B1 * | 3/2009 | Appelman | ........... | G06Q 10/107 709/204 |
| 2005/0172024 A1 * | 8/2005 | Cheifot | ............. | H04L 29/12009 709/225 |

(Continued)

FOREIGN PATENT DOCUMENTS

| | | |
|---|---|---|
| EP | 2160049 A1 | 3/2010 |
| WO | WO 2015/020488 A1 | 2/2015 |

OTHER PUBLICATIONS

"3rd Generation Partnership Project; Technical Specification Group Services and System Aspects; Presence Service; Architecture and functional description (Release 12)", 3GPP Draft; 23141-Cee, 3rd Generation Partnership Project (3GPP), Mobile Competence Centre ; 650, Route Des Lucioles , F-06921 Sophia-Antipolis Cedex , France.

(Continued)

*Primary Examiner* — Joseph Arevalo

(74) *Attorney, Agent, or Firm* — Optimus Patents US, LLC

(57) ABSTRACT

A TAI (Tracking Area Identifier) assigned to a small, 'presence' cell (106), which is different from that assigned to a neighbouring cell (101), forces a User Equipment (105) entering the presence cell's coverage area to attempt to register with the presence cell. The presence cell forwards the registration request (which includes the UE's temporary subscriber identity and the identity of the most recently serving Mobility Management Entity) to an additional network node (107) that appears as a Mobility Management Entity to other MMEs in the network. The network node then generates a request for the permanent subscriber identity of the UE and sends it to the most recently serving MME (103). The received permanent identity can be forwarded to a presence analytics server (108) for presence purposes. In some examples, use is made of the relevant 'Context (Continued)

Provision Access Point with TAI and broadcast 201
Receive RRC Connection Request at Access Point 202
Send Set-Up message to UE 203
Receive TAU and GUMMEI from UE 204
Forward TAU and GUMMEI to Network Node 205
Send Context request to identified MME 206
Receive IMSI 207
Send Acknowledgement with Cause to MME 208
Send IMSI to presence server 209
Send control message to Access Point 210
Send TAU to MME 211
Receive TAU Accept 212
Send TAU Accept to UE 213
Send notification to presence server 214

Request' or 'Identification Request' message and 'Tracking Area Update' message or 'Attach Request' message to obtain details of the UE despite the fact that it has not completed authentication with the presence cell.

18 Claims, 3 Drawing Sheets

(51) Int. Cl.

*H04W 8/02* (2009.01)
*H04W 8/26* (2009.01)
*H04W 48/10* (2009.01)
*H04W 60/04* (2009.01)
*H04W 84/04* (2009.01)

(58) Field of Classification Search

CPC ........... H04W 48/10; H04M 1/274516; H04M 1/7253

USPC ....... 455/410, 436, 434, 411, 448, 440, 458, 455/432.1, 67, 422.1

See application file for complete search history.

(56) References Cited

U.S. PATENT DOCUMENTS

2013/0040603 A1* 2/2013 Stahlberg ............. H04L 63/126 455/410
2013/0045733 A1 2/2013 Vikberg
2014/0280265 A1* 9/2014 Wang .................... H04H 60/37 707/758
2015/0269421 A1* 9/2015 Liu ....................... G06K 9/629 382/118

OTHER PUBLICATIONS

Caroline Gabriel: Presence cells: a new 1-15 wave of enterprise small cell solutions Executive Summary 2 Introduction and context 311 , Dec. 31, 2014 (Dec. 31, 2014), XP055279328.
"3rd Generation Partnership Project; 1-5, Technical Specification Group Services and 7-11, System Aspects; General Packet Radio 13-15 Service (GPRS) enhancements for Evolved Universal Terrestrial Radio Access Network (E-UTRAN) access (Release 9)", 3GPP Draft; 23401-9G0, 3rd Generation Partnership Project (3GPP), Mobile Competence Centre ; 650, Route Des Lucioles ; F-06921 Sophia-Antipolis Cedex ; France.

* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods for determining a subscriber identity of a wireless communication unit

BACKGROUND OF THE INVENTION

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™) (www.3gpp.org). The 3rd generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has designed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. In LTE a macrocell base station is generally known as an evolved NodeB (or eNB). An all IP EPC and an E-UTRAN together are often referred to as an Evolved Packet System (EPS). An EPS provides only packet switching (PS) domain data access so voice services are provided by a 2G or 3G Radio Access Network (RAN) and circuit switched (CS) domain network or Voice over IP (VoIP) techniques. User Equipment(UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (APs) with the term Home Node B (HNB's) or Evolved Home Node B (HeNB) identifying femtocell Access Points. Each small-cell is supported by a single Access Point. These small cells are intended to augment the wide area macro network and support communications to multiple User Equipment devices in a restricted, for example, indoor environment. An additional benefit of small cells is that they can offload traffic from the macro network, thereby freeing up valuable macro network resources An HNB or HeNB is an Access Point that provides a wireless interface for user equipment connectivity. A HNB provides a radio access network connectivity to a user equipment (UE) using the so-called Iub interface to a network Access Controller, also known as a Home Node B Gateway (HNB-GW). One Access Controller (AC) can provide network connectivity of several HNB's to a core network. A HeNB provides a radio access network connectivity using the so-called S1 interface to one or more network Access Controllers, known as an Mobility Management Entities (MMEs.) One MME can provide connectivity to many HeNBs or eNBs.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. These small cells are intended to be able to be deployed alongside the more widely used macro-cellular network and support communications to UEs in a restricted, for example 'in-building', environment.

Herein, the term "small cell" means any cell having a small coverage area and includes "picocells" and "femtocells."

It is often useful in cellular networks (including small cell networks) to obtain the permanent mobile subscriber identity (IMSI) or the permanent mobile equipment identity (IMEI) of the UEs which are accessing the small cells. This identity can be used for various purposes, one being to track UEs as they move through the macrocell or small cell network, thereby providing a so-called "presence" service. In 2G (GSM) and 3G systems, a common technique in small cells is for a Home Node B, (an Access Stratum device), to request the UE's permanent subscriber identity (IMSI) or IMEI using an NAS (Non-Access Stratum) Identity Request message, normally used by the Core Network. This is possible in these systems because the NAS messages are not generally ciphered by the core network and so can be used by local nodes. In LTE on the other hand, the protocol design authenticates and optionally encrypts the Non-Access Stratum (NAS) between the UE and the MME using separate keys from those used for authentication and typically encryption in the Access Stratum or the RRC (Radio Resource Control) layer, which is authenticated and typically encrypted between the UE and the eNode B and these NAS keys are not known to the Access Stratum devices such as the eNode B. Thus, the NAS security deployed in LTE means that an eNode B (or a Home eNode B) cannot use the same technique as is used in 3G, specifically cannot send a valid NAS Identity Request message to the UE, as it cannot generate the valid integrity protection code used for authentication of the message by the UE. Such a request would have to be issued by the MME and even if the MME were to issue such request, the UE response would not be readable by the eNode B if NAS encryption were enabled. There is no standard method for the eNode B to request that the MME generates such request and the MME will only rarely generate such a request under normal operation.

SUMMARY OF THE INVENTION

Accordingly, the invention seeks to mitigate, alleviate or eliminate the above-mentioned disadvantage.

Aspects of the invention provide network elements, a wireless communication system and methods therefor as described in the appended claims.

According to a first aspect of invention there is provided a method for determining a permanent identity of a wireless communication unit located within a cellular communication system comprising at least one core network element operably coupled to an access point, the method comprising: at an access point serving a first cell, receiving an assignment of a tracking area identifier relating to a tracking area that is different from a tracking area identifier relating to a tracking area assigned to neighbouring cells; broadcasting a signal containing the assigned tracking area identifier, receiving a connection request from a wireless communication unit located within the first cell wherein the connection request includes: a temporary identity of the wireless communication unit and information identifying a most recently serving core network element that most recently served the wireless communication unit, forwarding the connection request message to a network node; receiving (210) an instruction from the network node (107), in response to the network node receiving (207) a requested permanent identity of the wireless communication unit from an identified, most recently serving core network element, where the instruction is to forward the connection request to a core network element supporting the access point, and sending, on receipt of said instruction, the connection request to the core network element, supporting the access point.

According to a second aspect of invention there is provided a method for determining a permanent identity of a wireless communication unit located within a cellular communication system comprising at least one core network element operably coupled to an access point. The method comprising, at a network node: assigning to the access point a tracking area identifier relating to a tracking area that is different from a tracking area identifier relating to a tracking area assigned to neighbouring cells; receiving a connection request from a wireless communication unit forwarded by the access point. The connection request comprises: a temporary identity of the wireless communication unit, and information identifying a most recently serving core network element that most recently served the wireless communication unit. The method further comprises: sending, on receipt of the connection request message, a message to the identified, most recently serving core network element requesting the permanent identity of the wireless communication unit, receiving from the identified, most recently serving core network element, the requested permanent identity of the wireless communication unit, and sending an instruction to the access point to forward the connection request to a core network element supporting the access point.

According to a third aspect of invention there is provided an access point for determining a permanent identity of a wireless communication unit located within a cellular communication system comprising at least one core network element and a network node operably coupled to the access point, wherein the access point serves a first cell. The access point comprises a receiver arranged to receive an assigned tracking area identifier relating to a tracking area that is different from a tracking area identifier relating to a tracking area assigned to neighbouring cells and a transmitter arranged to broadcast a signal containing the assigned identifier, wherein the receiver is further arranged to receive a connection request message from a wireless communication unit located within the first cell. The connection request includes: a temporary identity of the wireless communication unit and information identifying a most recently serving core network element that most recently served the wireless communication unit. The transmitter is further arranged to forward the connection request message to the network node; and the receiver is further arranged to receive an instruction from the network node, in response to the network node receiving a requested permanent identity of the wireless communication unit from an identified, most recently serving core network element, where the instruction is to forward the connection request to a core network element supporting the access point, and wherein the transmitter is further arranged, on receipt of said instruction, to send the connection request to the core network element supporting the access point.

The access point may comprise an access point with some eNodeB capabilities. It may or may not be connected to the core network. The former case allows a communication service between a wireless communication unit located within the coverage area of the access point and the core network to be provided. The first cell (which is supported by the access point) may be considered as a presence cell and the network node may be arranged to send a presence notification message to a remote presence server or similar entity once it has received the permanent identity of the wireless communication unit.

According to a fourth aspect of invention there is provided a network node for determining a permanent identity of a wireless communication unit located within a cellular communication system comprising at least one core network element operably coupled to an access point, the network node comprising: a receiver coupled to a processor and arranged to receive a connection request message from a wireless communication unit forwarded by the access point. The connection request comprises: a temporary identity of the wireless communication unit, and information identifying a most recently serving core network element that most recently served the wireless communication unit. The processor is further arranged to, on receipt of the connection request message, send a message to the identified, most recently serving core network element requesting the permanent identity of the wireless communication unit, wherein the receiver and processor are further arranged to receive from the identified, most recently serving core network element, the requested permanent identity of the wireless communication unit, and the processor is further arranged to send an instruction to the access point to forward the connection request to a core network element supporting the access point.

The network node may be arranged to look like a Mobility Management Entity to other Mobility Management Entities in the cellular communications system.

According to a fifth aspect of the invention there is provided a wireless communication system including the access point and network node of the second aspect.

According to a sixth aspect of the invention, there is provided a non-transitory computer readable medium having computer readable instructions stored thereon for execution by a processor to perform the method of the first aspect.

The non-transitory computer-readable medium may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory'

The invention provides for assigning a TAI (Tracking Area Identifier) or TAC (Tracking Area Code) to a presence cell which is different from that assigned to a neighbouring cell which forces a UE entering the former's coverage area to attempt to register with the presence cell and also provides an additional network node that appears as an MME to a macro-MME or Serving GPRS (General Packet Radio System) Support Node (SGSN). In some examples, use is made of the relevant 'Context Request' or 'Identification Request' message and 'Tracking Area Update Request' message or 'Attach Request' message to obtain details of the UE despite the fact that it has not completed authentication with the presence cell.

In one embodiment, the permanent identity received from the identified last-serving core network element is a IMSI, (International Mobile Subscriber Identity).

In another embodiment, the permanent identity received from the identified last-serving core network element is an IMEI, (International Mobile Equipment Identity).

Advantageously, the invention can permit a presence system to determine the permanent identity of a UE operating solely in the LTE frequency band whilst, still allowing a standard, unmodified UE to receive communications services from a standard, unmodified, LTE network.

Advantageously, the invention provides an authenticated permanent identity because the NAS ciphering for integrity protection applied by the UE to the NAS messages used in the invention provides authentication to the same level as the network security.

These and other aspects, features and advantages of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Those skilled in the art will recognize and appreciate that the specifics of the specific examples described are merely illustrative of some embodiments and that the teachings set forth herein are applicable in a variety of alternative settings. For example, since the inventive concepts do not depend on any particular radio access technology or combination thereof, it is envisaged that the inventive concepts may be applied to other RAT's although LTE systems systems are shown in the embodiments. As such, other alternative implementations within cellular communication systems conforming to different standards are contemplated and are within the scope of the various teachings described. Furthermore, the inventive concepts may be applied to small cells or to macrocells or to systems comprising a combination of both.

Figure 1:
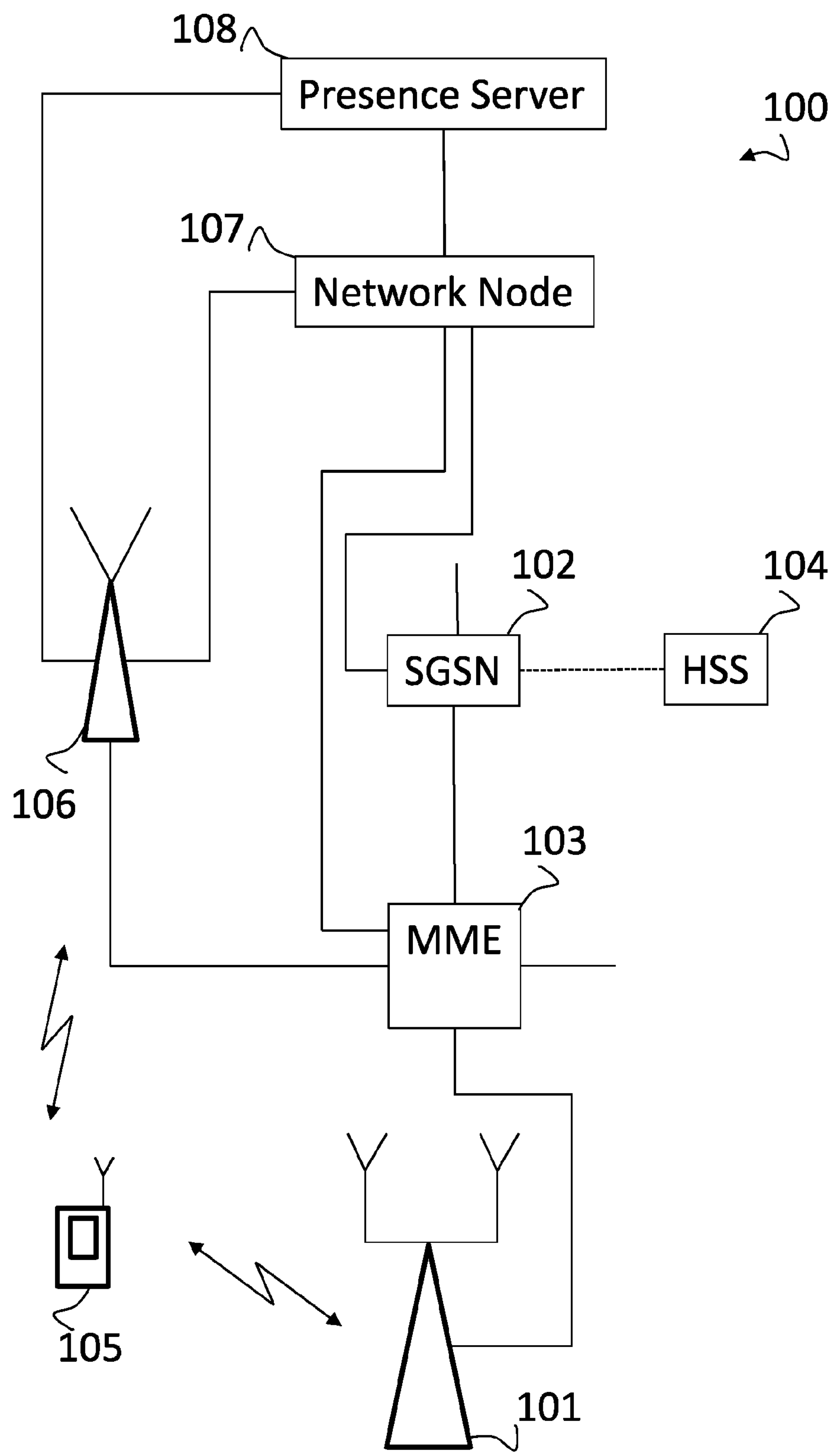
FIG. 1 illustrates a part of a cellular communication system including apparatus operating in accordance with an example embodiment of the invention for determining a permanent subscriber identity.

Referring now to FIG.1, an example of part of a cellular communication system operating in accordance with embodiments of the invention is illustrated and indicated generally at 100 and comprises an evolved Node B (eNode B) 101 supporting an LTE cell, which in this example is a macrocell. The eNodeB 101 is of conventional design and is provisioned with a Tracking Area Identity (TAI) which is a number configured into an eNodeB to denote a particular tracking area. Typically, the Tracking Area Identity is constructed from the MCC (Mobile Country Code), MNC (Mobile Network Code) and TAC (Tracking Area Code). The eNode B is connected to and communicates with an Evolved Packet Core (EPC) (or Core Network)) in a conventional manner. The Evolved Packet Core is connected to a Serving GPRS (General Packet Radio System) Support Node (SGSN) 102. Typically, an SGSN is provided for the purpose of mobility of a User Equipment between 2G, 3G and LTE networks. The Evolved Packet Core includes a Mobility Management Entity (MME) 103 and a Home Subscriber Server (HSS) 104. The SSGN 102 performs a routing and tunnelling function for signalling traffic to and from the cell supported by the eNodeB 101 via the MME 103. The MME 103 is connected to the eNode B 101 and is typically configured to process signalling between a User Equipment 105 within the coverage area of the eNodeB 101 and the rest of the Core Network. The MME 103 is connected to the SGSN by means of the so-called S3 interface. The Core Network may comprise other MME's (not shown) which are connected to other eNodeB's (not shown) and which are connected to one another by means of the so-called S10 interface.

An access point 106 comprises at least a receiver, a transmitter and a processor and is configured to perform certain conventional functions of an LTE eNodeB and also certain other functions in accordance with the invention to be described in detail below. The access point 106 supports a cell, which in this example, may be considered to be a small cell, underneath the macrocell that is supported by the eNodeB 101. This small cell may also be considered to be a presence cell. The access point 106 is provisioned with a Tracking Area Identity (TAI), which is different from that assigned to the eNodeB 101. In one embodiment, the access point 106 is provisioned with a TAC that is different from the TAC of the macrocell supported by the eNodeB 101. Preferably, the TAI (or TAC) assigned to the access point 106 is different from that of all neighbouring cells. In other embodiments, several similar, neighbouring access points can be located within a geographical zone where a presence service is required and each access point has a unique TAI (or TAC) different from its neighbours.

The access point 106 is connected to a network node 107. The network node 107 comprises at least a receiver, a transmitter and a processor and is connected to the MME 103 by means of an interface which supports relevant S10 messaging. The network node 107 is configured such that to the MME 103, it appears to be another MME of the Core Network. The network node is also connected to a presence server 108. In other embodiments, the network node 107 is also connected to other MME's and SGSN's of the Core Network that serve cells in the area where the access point 106 is located. The access point 106 is connected to the presence server 108 and to the MME 103.

In this embodiment, the access point 106 has the capability to provide communication services to the UE 105 via the core network.

Figure 2:
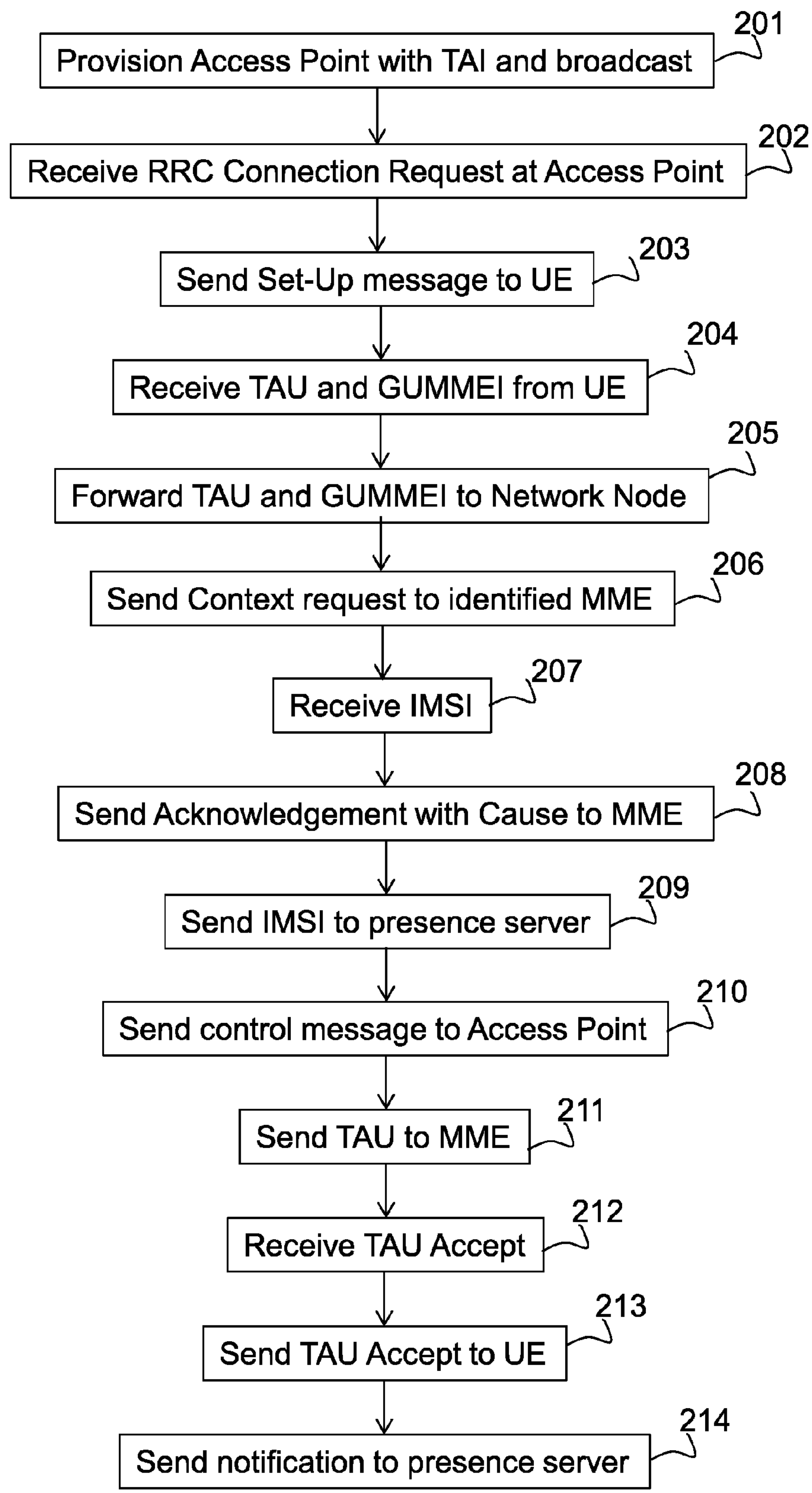
FIG. 2 is a simplified flowchart of a first example of a method for determining a permanent subscriber identity.

A first example of operation of the embodiment of FIG.1 will now be described with reference to FIG.1 and to the flowchart of FIG. 2. At 201, the access point 106 is provisioned with a TAI which is different from that assigned to the macrocell supported by the eNodeB 101. The access point 106 transmits a broadcast signal which conveys its TAI or TAC. Initially, the UE 105 is switched on and within the coverage area of the macrocell supported by the eNodeB 101 and the MME 103. Subsequently, the UE 105 moves into the coverage area of the presence cell which is supported by the access point 106 (and MME 103) and reads the broadcast signal. On reading the broadcast signal, the UE 105 detects that the Tracking Area has changed. In an alternative, situation, the UE is initially switched off and then switches on when in the coverage area of the presence cell. In this case, the UE 105 can detect a change in TAI compared with the last cell that it was "camped on" to. In either case, the UE 105 reacts to this detected change of TAI. In this embodiment, the UE 106 is in idle mode and so in accordance with conventional techniques, initiates an RRC (Radio Resource Control) Connection Request towards the access point 106. Such a request procedure typically completes by sending a NAS (Non-Access Stratum) message which includes an identity which has been allocated to the UE 105 by its most recently serving MME 103. In this example, the most recently serving MME is the MME which is connected to the eNodeB 101, that is MME 103 of FIG. 1. This temporary identity is commonly referred to as the GUTI (Globally Unique Temporary Identity).

At 202 the access point 106 receives from the UE 105 the RRC Connection Request.

At 203, the access point 106 responds to the RRC Connection Request by sending an RRC Connection Set-up message to the UE 105.

The radio connection set-up process continues and at 204 the access point 106 receives from the UE 105 an "Initial (NAS) UE message." In this example, the Initial UE message is a Tracking Area Update (TAU) Request which is carried embedded in the RRC Connection Set-Up Complete message which is sent from the UE 105 to the access point 106. The Connection Set-up Complete message also includes the GUMMEI (Globally Unique MME Identity) of the Core Network node which most recently served the UE 105. In this example it is the MME 103. In other instances it may be an SGSN or another MME (not shown). The TAU Request Message contained in the Connection Set-Up Complete message further contains the Globally Unique Temporary Identity (GUTI) assigned to the UE by that Core Network node.

At 205, the access point 106 forwards the Initial UE message and GUMMEI to the network node 107 rather than sending it directly to the MME which is connected to the access point 106 (that is MME 103 in this example), as it would do according to standard procedures. The access point 106 retains the information received in this initial message. The information sent is, typically, integrity-protected but not ciphered. Therefore it is readable by the network node 107. Thus, the network node 107 is notified of the identity of the most recently-serving MME 103 and a (temporary) identity of the UE 105.

At 206, the network node 107 generates a Context Request message (in accordance with LTE convention) and sends it to the identified most recently serving MME (MME 103 in this example). The Context Request typically contains the TAU Request including the GUTI and allows details of a UE (without an IMSI being supplied) to be requested as long as the TAU Request is included in the message.

After validating the received TAU message and authenticating the UE 105, the MME 103 (acting as the most recently serving MME) issues a Context Response message which, at 207, is received by the network node 107. As is conventional, the Context Response contains the IMSI of the UE 105 and a Mobile Equipment Identity (IMEI) in the Mobility management context. Thus the network node 107 is informed of the (permanent) unique identity of the UE 105 which is useful for 'presence purposes.

The TAU process continues at 208 with the network node 107 issuing a Context Acknowledgement message towards the MME 103. The Context Acknowledgement includes a Cause; "User Identification Failed." This results in the MME 103 (acting as the most recently serving MME) proceeding as if the TAU attempt had never happened; (ie. the Context Request was never received) as in accordance with standard techniques.

At 209, the network node sends the IMSI (or IMEI or both) of the UE 105 to the presence server. This information is an indication that a particular subscriber (or equipment) entered a particular geographical zone at a particular time. This information be used by a presence service entity and can be useful for advertising and/or authentication purposes. Optionally, the presence server 108 timestamps each such notification that it receives from the network node 107.

At 210, the network node 107 generates and sends to the access point 106 a control message, instructing the access point 106 to forward the Initial UE message to its supporting MME (which in this example is MME103).

Hence, at 211 the Initial UE message, which comprises a TAU Request, together with the GUMMEI, is sent by the access point 106 to the MME 103 (now acting as a currently serving MME). If, in an alternative embodiment where there is no connection between the access point 106 and the MME 103, then the access point 106 may direct the UE 105 to a suitable neighbouring cell using a conventional RRC Connection Release process, for example.

In response to receiving the initial UE message, the MME 103 in accordance with standard procedures, transmits a Tracking Area Update Accept message which, at 212 is received by the access point 106.

In cases where the most recently serving MME is different from MME 103, then in response to receiving the initial UE message, the MME 103, in accordance with standard procedure, identifies the most recently serving MME of the UE 105 from the GUMMEI in the supplied message, generates a Context Request message (in accordance with LTE convention) and sends it to the identified most recently serving MME (or other most recently serving Core Network node such as an SGSN), receives a Context Response containing the UE context including identity and other details, and transmits a Tracking Area Update Accept message which, at 212 is received by the access point 106.

At 213, the access point 106 forwards the TAU Accept message to the UE 105.

At 214, the access point 106 sends a notification to the presence server 108 to inform it that a presence process has been completed.

Figure 3:
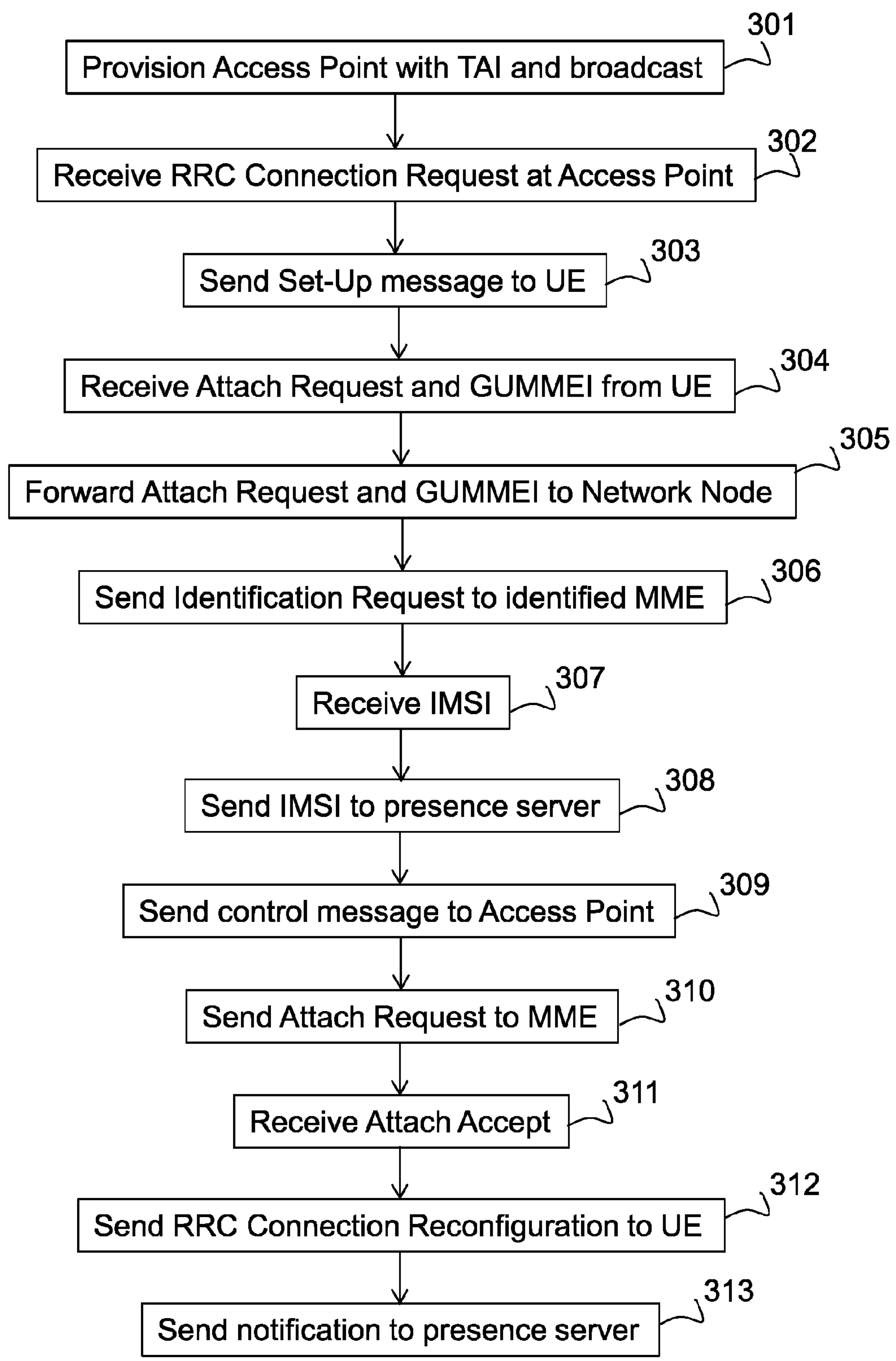
FIG. 3 is a simplified flowchart of a second example of a method for determining a permanent subscriber identity.

A second example of operation of the embodiment of FIG.1 will now be described with reference to FIG.1 and to the flowchart of FIG. 3. At 301, the access point 106 is provisioned with a TAI which is different from that assigned to the macrocell supported by the eNodeB 101. The access point 106 transmits a broadcast signal which conveys its TAI. Initially, the UE 105 is switched on and within the coverage area of the macrocell and its currently serving MME is the MME 103 of FIG. 1. Subsequently, the UE 105 moves into the coverage area of the presence cell which is supported by the access point 106 and reads the broadcast signal. On reading the broadcast signal, the UE 105 detects that the Tracking Area Identity has changed. In an alternative, situation, the UE is initially switched off and then switches on when in the coverage area of the presence cell. In this case, the UE 105 can detect a change in TAI compared with the last cell that it was "camped on" to. In either case, the UE 105 reacts to this detected change of TAI. In this embodiment, the UE 106 is in idle mode and so in accordance with conventional techniques, initiates an RRC (Radio Resource Control) Connection Request towards the access point 106. Such a request procedure typically completes by sending a NAS (Non-Access Stratum) message which includes an identity which has been allocated to the UE 105 by its most recently serving MME 103. This temporary identity is commonly referred to as the GUTI (Globally Unique Temporary Identity).

At 302 the access point 106 receives from the UE 105 the RRC Connection Request.

At 303, the access point 106 responds to the RRC Connection Request by sending an RRC Connection Set-up message to the UE 105.

The radio connection set-up process continues and at 304 the access point 106 receives from the UE 105 an "Initial (NAS) UE message." In this example, the Initial UE message is an Attach Request which is carried embedded in the RRC Connection Set-Up Complete message which is sent from the UE 105 to the access point 106. The Connection Set-up Complete message also includes the GUMMEI (Globally Unique MME Identity) of the Core Network node which last served the UE 105. In this example it is the MME 103. In other instances it may be SGSN. The Attach Request message contained in the Connection Set-up Complete message further contains the GUTI assigned to the UE by that Core Network node.

At 305, the access point 106 forwards the Initial UE message (Attach Request) and GUMMEI to the network node 107 rather than directly to its supporting MME 103 as it would do according to standard procedures. The access point 106 retains the information received in this initial message. The information sent is, typically, integrity-protected but not ciphered. Therefore it is readable by the network node 107. Thus, the network node 107 is notified of the identity of the last-serving MME 103 and a (temporary) identity of the UE 105.

At 306, the network node 107 generates an Identification Request message (in accordance with LTE convention) and sends it to the identified last-serving MME 103 (or other last-serving Core Network node such as an SGSN). The Identification Request typically contains the Attach Request and GUTI.

After validating the received Attach Request message and authenticating the UE 105, the MME 103 issues an Identification Response message which, at 307, is received by the network node 107. As is conventional, the Identification Response contains the IMSI of the UE 105. Thus the network node 107 is informed of the unique identity of the UE 105 which is useful for presence purposes.

At 308, the network node sends the IMSI (or IMEI or both) of the UE 105 to the presence server. This information is an indication that a particular subscriber entered a particular geographical zone at a particular time. This information be used by a presence service entity and can be useful for advertising and authentication purposes. Optionally, the presence server 108 timestamps each such presence notification that it receives from the network node 107.

At 309, the network node 107 generates and sends to the access point 106 a control message, instructing the access point 106 to forward the Initial UE message to the identified MME 103.

Hence, at 310, the Initial UE message, which comprises an Attach Request, is sent by the access point 106 to the MME 103 (now acting as a currently serving MME). If, in an alternative embodiment, there is no connection between the access point 106 and the MME 103, then the access point 106 may direct the UE 105 to a suitable neighbouring cell using a conventional RRC Connection Release process, for example.

In response to receiving the initial UE message, the MME 103, in accordance with standard procedure, transmits an Initial Context Set-Up Request (Attach Accept) message which, at 311 is received by the access point 106.

In cases where the most recently serving MME is different from MME 103, then in response to receiving the initial UE message, the MME 103, in accordance with standard procedure, identifies the most recently serving MME of the UE 105 from the GUMMEI in the supplied message, generates an Identification Request message (in accordance with LTE convention) and sends it to the identified most recently serving MME (or other most recently serving Core Network node such as an SGSN), receives an Identification Response containing the UE context including identity and other details, and transmits an Initial Context Set-Up Request (Attach Accept) message which, at 311 is received by the access point 106.

At 312, the access point 106 sends a RRC Connection Reconfiguration message (Attach Request, Measurement Configuration) to the UE 105.

At 313, the access point 106 sends a notification to the presence server 108 to inform it that a presence process has been completed.

It will be noted that in either of the two embodiments of operation described above with reference to FIG. 2 or 3, the UE's most recently serving Core Network node (MME 103 or an SGSN, for example)) will not remove a UE Mobility Management context until it receives a Location Cancel message from the HSS 104, which it will not do until a currently serving MME has notified the HSS 104 of a Location Update.

The invention can be implemented in cases where the access point 106 is not configured to provide communication services (and in particular, LTE services) as long as a UE 105 can 'survive' not receiving a response to its RRC Connection Setup Complete/Initial UE Message (for example, by timing out).

The signal processing functionality of the embodiments of the invention, particularly the access point 106 and network node 107 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A method for determining a permanent identity of a wireless communication unit located within a cellular communication system comprising at least one core network element operably coupled to an access point, the method comprising, at an access point:

serving a first cell, receiving an assignment of a tracking area identifier relating to a tracking area that is different from a tracking area identifier relating to a tracking area assigned to neighbouring cells;

broadcasting a signal containing the assigned tracking area identifier, receiving a connection request from a wireless communication unit located within the first cell, wherein the connection request includes:

a temporary identity of the wireless communication unit, and information identifying a most recently serving core network element that most recently served the wireless communication unit, forwarding the connection request message to a network node;

receiving an instruction from the network node, in response to the network node receiving a requested permanent identity of the wireless communication unit from an identified, most recently serving core network element, where the instruction is to forward the connection request to a core network element supporting the access point, and sending, on receipt of said instruction, the connection request to the core network element supporting the access point.

2. The method of claim 1, wherein the permanent identity received from the identified most recently serving core network element is one from a group of: an International Mobile Subscriber Identity, IMSI, an International Mobile Equipment Identity, IMEI.

3. The method of claim 1, wherein the tracking area identifier relating to a tracking area is a Tracking Area Identity, TAI.

4. The method of claim 1, wherein the access point serves a presence cell and the method further comprises, sending the received permanent identity of the wireless communication unit to a presence server associated with the presence cell.

5. A method for determining a permanent identity of a wireless communication unit located within a cellular communication system comprising at least one core network element operably coupled to an access point, the method comprising, at a network node:

assigning to the access point, a tracking area identifier relating to a tracking area that is different from a tracking area identifier relating to a tracking area assigned to neighbouring cells;

receiving a connection request from a wireless communication unit forwarded by the access point, wherein the connection request comprises:

a temporary identity of the wireless communication unit, and information identifying a most recently serving core network element that most recently served the wireless communication unit, sending, on receipt of the connection request message, a message to the identified, most recently serving core network element requesting the permanent identity of the wireless communication unit, receiving from the identified, most recently serving core network element, the requested permanent identity of the wireless communication unit, and sending an instruction to the access point to forward the connection request to a core network element supporting the access point.

6. The method of claim 5, wherein the permanent identity received from the identified most recently serving core network element is one from a group of: an International Mobile Subscriber Identity, IMSI, an International Mobile Equipment Identity, IMEI.

7. The method of claim 5, wherein the tracking area identifier relating to a tracking area is a Tracking Area Identity, TAI.

8. The method of claim 5, wherein the connection request comprises a Tracking Area Update Request and the message requesting the permanent identity of the wireless communication unit generated by the network node and sent to the most recently-serving core network element comprises a Context Request message.

9. The method of claim 5, wherein the connection request comprises a Tracking Area Update Request and the message requesting the permanent identity of the wireless communication unit generated by the network node and sent to the most recently-serving core network element comprises a Context Request message.

10. The method of claims 5, wherein the connection request comprises an Attach Request and the message requesting the permanent identity of the wireless communication unit generated by the network node and sent to the most recently serving core network element comprises an Identification Request.

11. An access point for determining a permanent identity of a wireless communication unit located within a cellular communication system comprising at least one core network element and a network node operably coupled to the access point wherein the access point serves a first cell, wherein the access point comprises:

a receiver operably coupled to a processor and arranged to receive an assigned tracking area identifier relating to a tracking area that is different from a tracking area identifier relating to a tracking area assigned to neighbouring cells, and a transmitter operably coupled to the processor and arranged to broadcast a signal containing the assigned tracking area identifier, wherein the receiver and processor are further arranged to receive a connection request from a wireless communication unit located within the first cell, wherein the connection request includes:

a temporary identity of the wireless communication unit, and information identifying a most recently serving core network element that most recently served the wireless communication unit and wherein the transmitter is further arranged to forward the connection request to the network node; and wherein the processor is further arranged to receive an instruction from the network node, in response to the network node receiving a requested permanent identity of the wireless communication unit from an identified, most recently serving core network element, where the instruction is to forward the connection request to a core network element supporting the access point, and wherein the transmitter is further arranged, on receipt of said instruction, to send the connection request to the core network element, supporting the access point.

12. The access point of claim 11, wherein the permanent identity received from the identified last-serving core network element is one from a group of: an International Mobile Subscriber Identity, IMSI, an International Mobile Equipment Identity, IMEI.

13. A network node for determining a permanent identity of a wireless communication unit located within a cellular communication system comprising at least one core network element operably coupled to an access point, the network node comprising:

a receiver coupled to a processor and arranged to receive a connection request message from a wireless communication unit forwarded by the access point, wherein the connection request comprises:

a temporary identity of the wireless communication unit, and information identifying a most recently serving core network element that most recently served the wireless communication unit, wherein the processor is further arranged to, on receipt of the connection request message, send a message to the identified, most recently serving core network element requesting the permanent identity of the wireless communication unit, wherein the receiver and processor are further arranged to receive from the identified, most recently serving core network element, the requested permanent identity of the wireless communication unit, and the processor is further arranged to send an instruction to the access point to forward the connection request to a core network element supporting the access point.

14. The network node of claim 13, wherein the permanent identity received from the identified last-serving core network element is one from a group of: an International Mobile Subscriber Identity, IMSI, an IMEI, International Mobile Equipment Identity.

15. The network node of claim 13, wherein the access point serves a presence cell and wherein the transmitter is further arranged to send the received permanent identity of the wireless communication unit to a presence server.

16. A wireless communication system comprising a network node and an access point configured to:

serve a first cell, receive an assignment of a tracking area identifier relating to a tracking area that is different from a tracking area identifier relating to a tracking area assigned to neighbouring cells;

broadcast a signal containing the assigned tracking area identifier, receive a connection request from a wireless communication unit located within the first cell, wherein the connection request includes:

a temporary identity of the wireless communication unit, and information identifying a most recently serving core network element that most recently served the wireless communication unit, forward the connection request message to the network node;

receive an instruction from the network node, in response to the network node receiving a requested permanent identity of the wireless communication unit from an identified, most recently serving core network element, where the instruction is to forward the connection request to a core network element supporting the access point, and send, on receipt of said instruction, the connection request to the core network element supporting the access point.

17. A non-transitory computer readable medium having computer readable instructions stored thereon for execution by a processor to perform a method for determining a permanent identity of a wireless communication unit located within a cellular communication system comprising at least one core network element operably coupled to an access point, the method comprising, at an access point:

serving a first cell, receiving an assignment of a tracking area identifier relating to a tracking area that is different from a tracking area identifier relating to a tracking area assigned to neighbouring cells;

broadcasting a signal containing the assigned tracking area identifier, receiving a connection request from a wireless communication unit located within the first cell, wherein the connection request includes:

a temporary identity of the wireless communication unit, and information identifying a most recently serving core network element that most recently served the wireless communication unit, forwarding the connection request message to a network node;

receiving an instruction from the network node, in response to the network node receiving a requested permanent identity of the wireless communication unit from an identified, most recently serving core network element, where the instruction is to forward the connection request to a core network element supporting the access point, and sending, on receipt of said instruction, the connection request to the core network element supporting the access point.

18. The non-transitory computer-readable medium of claim 17, comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

* * * * *